United States Patent [19]
Ishida

[11] Patent Number: 5,526,492
[45] Date of Patent: Jun. 11, 1996

[54] SYSTEM HAVING ARBITRARY MASTER COMPUTER FOR SELECTING SERVER AND SWITCHING SERVER TO ANOTHER SERVER WHEN SELECTED PROCESSOR MALFUNCTIONS BASED UPON PRIORITY ORDER IN CONNECTION REQUEST

[75] Inventor: Atsunori Ishida, Tokyo, Japan

[73] Assignee: Kabushiki Kaisha Toshiba, Kawasaki, Japan

[21] Appl. No.: 364,402

[22] Filed: Dec. 23, 1994

Related U.S. Application Data

[63] Continuation of Ser. No. 841,023, Feb. 25, 1992, abandoned.

[30] Foreign Application Priority Data

Feb. 27, 1991 [JP] Japan ................................ 3-032976

[51] Int. Cl.⁶ .................................................. G06F 13/00
[52] U.S. Cl. ........................... 395/200.09; 395/200.06; 395/200.03; 395/180; 364/222.2; 364/242.94; 364/265.1; 364/DIG. 1
[58] Field of Search ......................... 395/200, 200.06, 395/200.03, 180, 375

[56] References Cited

U.S. PATENT DOCUMENTS

| | | | |
|---|---|---|---|
| 3,593,300 | 7/1971 | Driscoll | 395/650 |
| 4,757,267 | 7/1988 | Riskin | 379/113 |
| 5,109,486 | 4/1992 | Seymour | 395/200.11 |
| 5,136,716 | 8/1992 | Harvey et al. | 395/200.06 |
| 5,263,157 | 11/1993 | Jamis | 395/200.06 |

OTHER PUBLICATIONS

"A Yellow–Pages Service for a Local–Area Network", by Larry L. Peterson, 1988, pp. 235–242.

*Primary Examiner*—Thomas C. Lee
*Assistant Examiner*—Moustafa Mohamed Meky
*Attorney, Agent, or Firm*—Finnegan, Henderson, Farabow, Garrett & Dunner

[57] ABSTRACT

Computer resources of a plurality of computers are managed by a resource manager of a master computer, and allotment of a server for a connection request is determined based on these physical and logical resources managed by the resource manager. A loosely coupled computer system can be regarded as one node when viewed from another system. When one computer in the loosely coupled computer system malfunctions, it is automatically replaced with another computer.

2 Claims, 4 Drawing Sheets

| COMPUTER NAME | PHYSICAL RESOURCE | LOGICAL RESOURCE |
|---|---|---|
| COMPUTER 1 | | |
| COMPUTER 2 | | |
| COMPUTER 3 | | |

F I G. 3

| CONNECTION NAME | SERVER CANDIDATE 1 | SERVER CANDIDATE 2 | |
|---|---|---|---|
| A | COMPUTER 2 | COMPUTER 3 | |
| B | COMPUTER 3 | COMPUTER 2 | |

F I G. 4

| CONNECTION DATA | SERVER CANDIDATE ORDER DATA |
|---|---|

F I G. 5

SYSTEM HAVING ARBITRARY MASTER COMPUTER FOR SELECTING SERVER AND SWITCHING SERVER TO ANOTHER SERVER WHEN SELECTED PROCESSOR MALFUNCTIONS BASED UPON PRIORITY ORDER IN CONNECTION REQUEST

This application is a continuation of application Ser. No. 07/841,023 filed Feb. 25, 1992, now abandoned.

BACKGROUND OF THE INVENTION

1. Field of the Invention

The present invention relates to a loosely coupled computer system having a communication function with other computer systems.

2. Description of the Related Art

Conventionally, communications between a loosely coupled computer system and other external computer systems are realized by respectively setting communication controllers in computers constituting the loosely coupled computer system.

In this case, when viewed from other computer systems, each of a plurality of computers constituting the loosely coupled computer system serves as an independent node. Each client designates a server address to perform communications with computers. For this reason, in a conventional system, each computer has predetermined communication performance. In addition, when a computer in communication malfunctions, a communication error occurs at that time, and connections must be re-set.

Gateway or pass-through processors may be arranged between the loosely coupled computer system and other computer systems. The gateway or pass-through processors cannot allow connections in consideration of performance of the computers, and communication performance is impaired. In the conventional system, the communication performance between the loosely coupled computer system and other systems is determined by computers constituting the loosely coupled computer system. For this reason, sufficient communication performance cannot be obtained.

SUMMARY OF THE INVENTION

It is an object of the present invention to provide a loosely coupled computer system, which can provide sufficiently high communication performance since it can realize connections with other systems in consideration of performance of computers constituting the loosely coupled computer system.

In order to achieve the above object, a loosely coupled computer system of the present invention comprises: resource management means for managing computer resources of a plurality of computers constituting the loosely coupled computer system; communication control means for controlling a connection between each of the plurality of computers and another system; and server allotment means for, when the communication control means receives a connection request from another computer system, selecting a computer serving as a server for the connection request from the plurality of computers on the basis of the contents of computer resources.

According to the add-on loosely coupled computer system of the present invention, computer resources of a plurality of computers are managed by the resource management means, and allotment of a server in response to a connection request is determined based on these computer resources. For this reason, a computer having optimal computer resources can serve as a server in correspondence with a connection request from another computer system, thus improving communication performance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a view showing the content of a resource management table managed by a resource manager of a computer, which serves as a master computer;

FIG. 4 is a table showing a correspondence between connection requests and corresponding server candidates;

FIG. 5 shows a format of a message for setting a connection, which message is informed to a first server candidate computer having the highest priority.

DETAILED DESCRIPTION OF THE PREFERRED EMBODIMENTS

Figure 1:
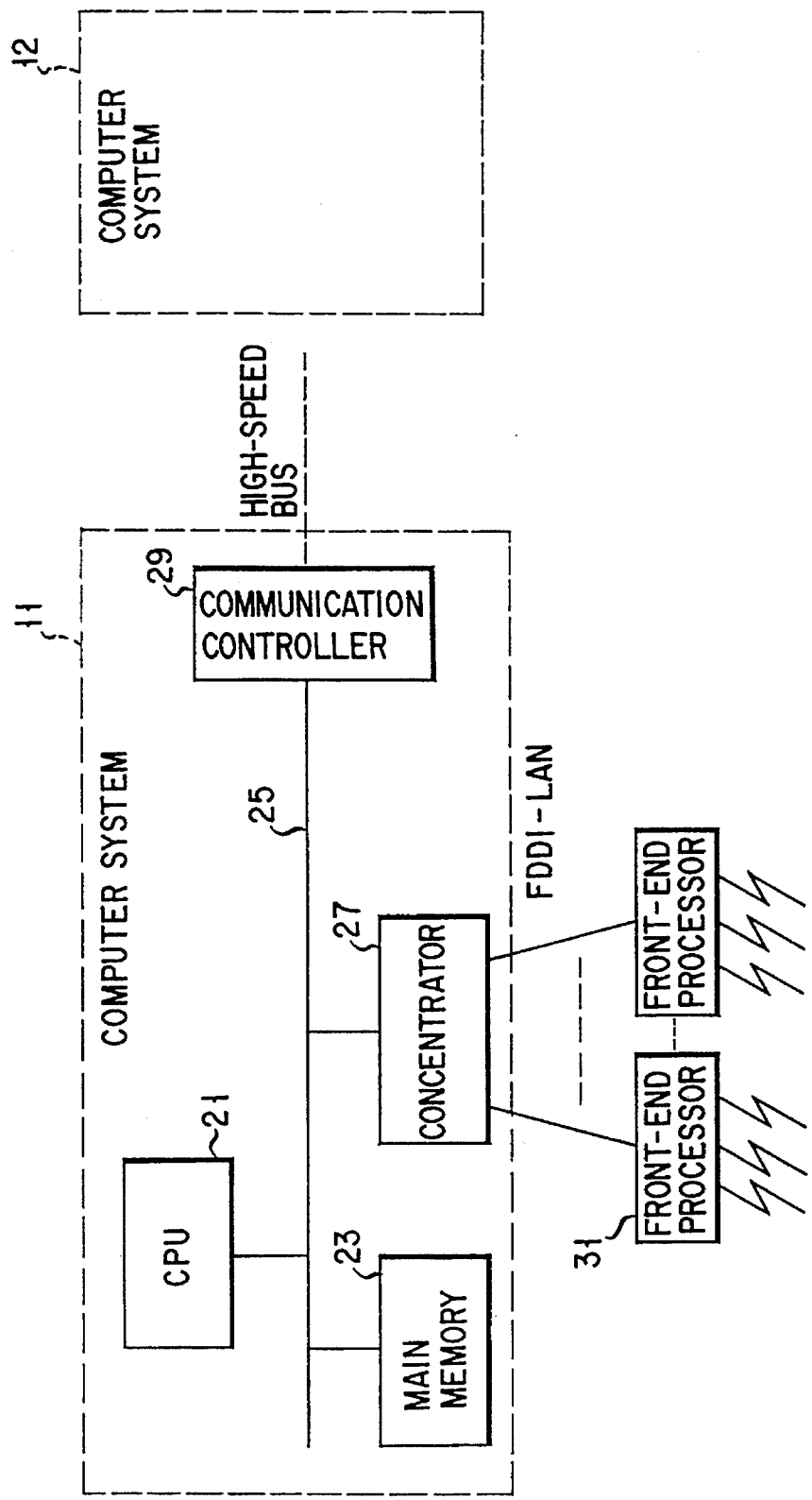
FIG. 1 is a block diagram showing the overall arrangement of an add-on loosely coupled computer system according to the present invention.

FIG. 1 is a block diagram showing the overall arrangement of an add-on loosely coupled computer system. Each of computer systems (or computers) 11 and 12 constituting the loosely coupled computer system comprises a CPU (central processing unit) 21, a main memory 23, a concentrator 27, and a communication controller 29. These units are connected to each other through a system bus 25. The computer 11 is connected to the other computer 12 or other computers (not shown) through the communication controller 29 and a high-speed bus on the order of several tens of Mbits. Front-end processors 31 for performing communication control and network control are connected to the concentrator 27 through an FDDI (fiber distributed digital interface)-LAN. The concentrator 27 serves as a repeater for connecting the plurality of front-end processors 31 to the CPU 21.

Figure 2:
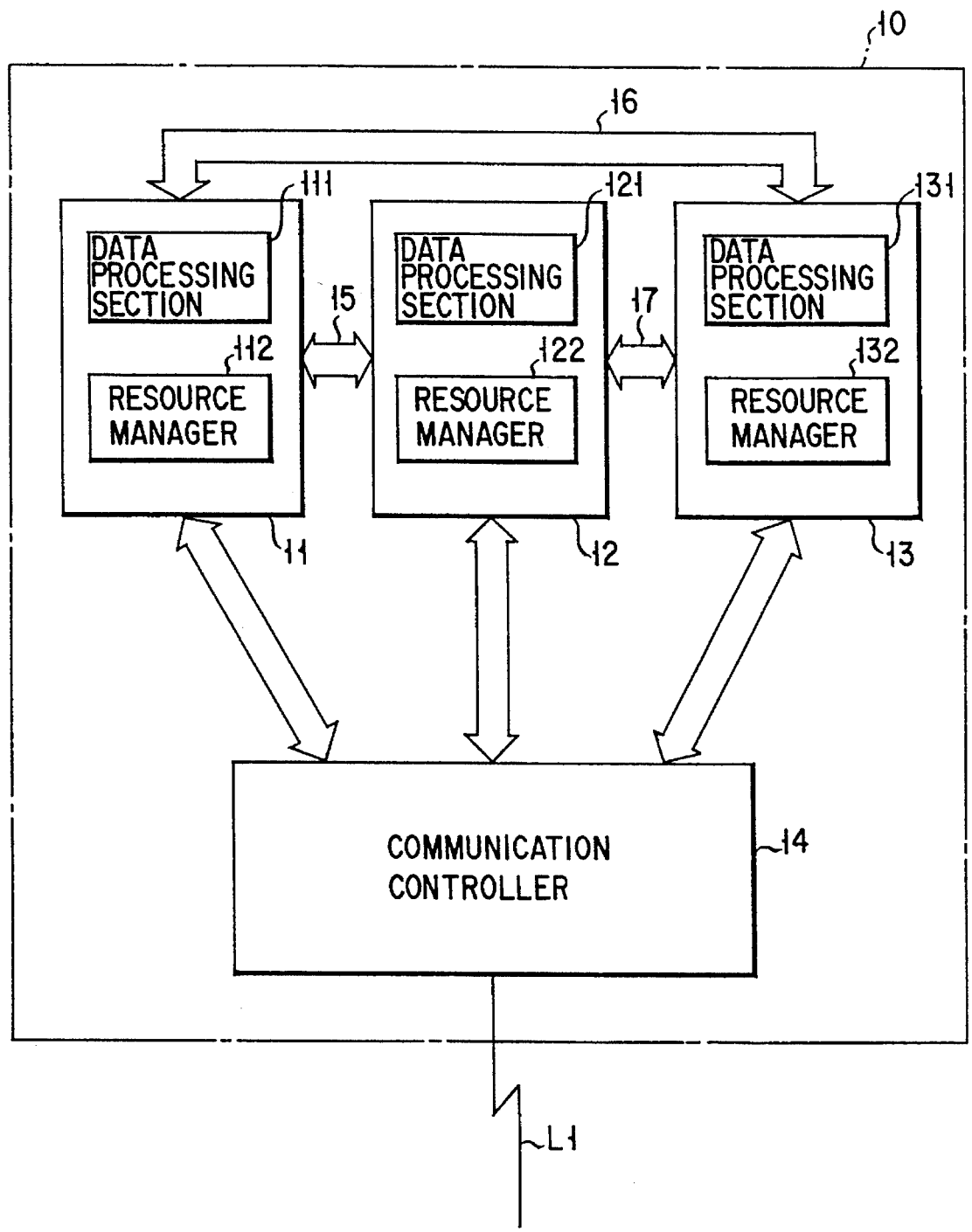
FIG. 2 is a schematic diagram showing functions of the add-on loosely coupled computer system.

FIG. 2 is a functional block diagram of the loosely coupled computer system. In this embodiment, a loosely coupled computer system 10 is constituted by first through third computers 11 through 13, and a communication controller 14. The first computer 11 is connected to the second computer 12 through a bus 15, and is also connected to the third computer 13 through a bus 16. The second and third computers 12 and 13 are connected to each other through a bus 17. The computers 11 through 13 respectively have specific storage devices, and their operations are controlled by independent operating systems. Communications among the computers 11 through 13 are executed in a message form in units of processes.

The computer 11 includes a data processing section 111 and a resource manager 112. The data processing section 111 executes various data processing operations such as an I/O operation, a delete operation, an updating operation, and the like of data on files. More specifically, the data processing section 111 serves as a server for executing a function according to a processing request from a client. The resource manager 112 manages resource data including physical resources such as the CPU 21, the memory 23, and the like of the computer 11, and logical resources such as files, and also manages resource data of the computers 12 and 13. These resource data are updated by message exchange operations, which are periodically performed between the computer 11 and the computers 12 and 13 so as to check operation states. The second and third computers 12 and 13 comprise data processing sections 121 and 131, and resource managers 122 and 132, respectively, like in the first computer 11.

In this embodiment, the first computer 11 servers as a master computer, and its resource manager 112 manages the resources of all the computers 11 through 13. For this reason, the resource managers 122 and 132 need only manage resources of the corresponding computers, and need not manage resources of other computers. Note that the computers other than the master computer have a function of informing local resource data managed by themselves to the master computer.

Each of these resource managers 112, 122, and 132 has a communication function for transmitting various communication requests (start service, end service, transmission, reception) to the communication controller 14, starting jobs of the data processing section 111, 121, or 131, and executing, e.g., synchronization control among the computers 11 through 13, in addition to the above-mentioned resource management function.

The communication controller 14 controls communications between another computer system connected through a communication line L1, and the computers 11 through 13. Upon reception of a connection request from another computer system, the communication controller 14 informs the connection request to the computer 11 as the master computer. Communications between a computer selected as a server by the master computer, and the other system are executed through the communication controller 14. Note that one of the computers 11 through 13 is determined as the master computer as follows. For example, a computer, which is started earliest, is determined as the master computer, and the computer, which is determined as the master computer, performs polling to other computers to inform that it serves as the master computer.

FIG. 3 shows the content of a resource management table managed by the resource manager 112 of the computer 11. As shown in FIG. 3, in a resource management table 33, the contents of physical resources such as CPUs, memories, and the like, and the contents of logical resources such as files are managed in units of the computers 11 through 13. In practice, the number of I/O waits (load amounts), information indicating whether or not a computer is normally operated, and the like are also managed in units of the computers 11 through 13.

FIG. 4 shows a correspondence between connection requests and corresponding server candidate names. In this embodiment, in response to a connection request having a connection name "A", the second computer 12 is selected as a first server candidate., and the third computer 13 is selected as a second server candidate. In response to a connection request having a connection name "B", the third computer 13 is selected as a first server candidate, and the second computer 12 is selected as a second server candidate. In this manner, the resource manager 112 selects a plurality of server candidates having a priority order in correspondence with one connection request.

FIG. 5 shows a message 35 for establishing a connection, which message is informed from the resource manager 112 to a computer as the first server candidate having the highest-priority. As shown in FIG. 5, the message 35 includes connection data, and server candidate order data. The connection data includes data (a job name to be start-requested, a job name to be utilized in a job start operation, log-in data, a client name, and the like) associated with a connection, which data are sent from another system to the resource manager 112 through the communication controller 14. The server candidate order data indicates the plurality of server candidates having the priority order.

Figure 6:
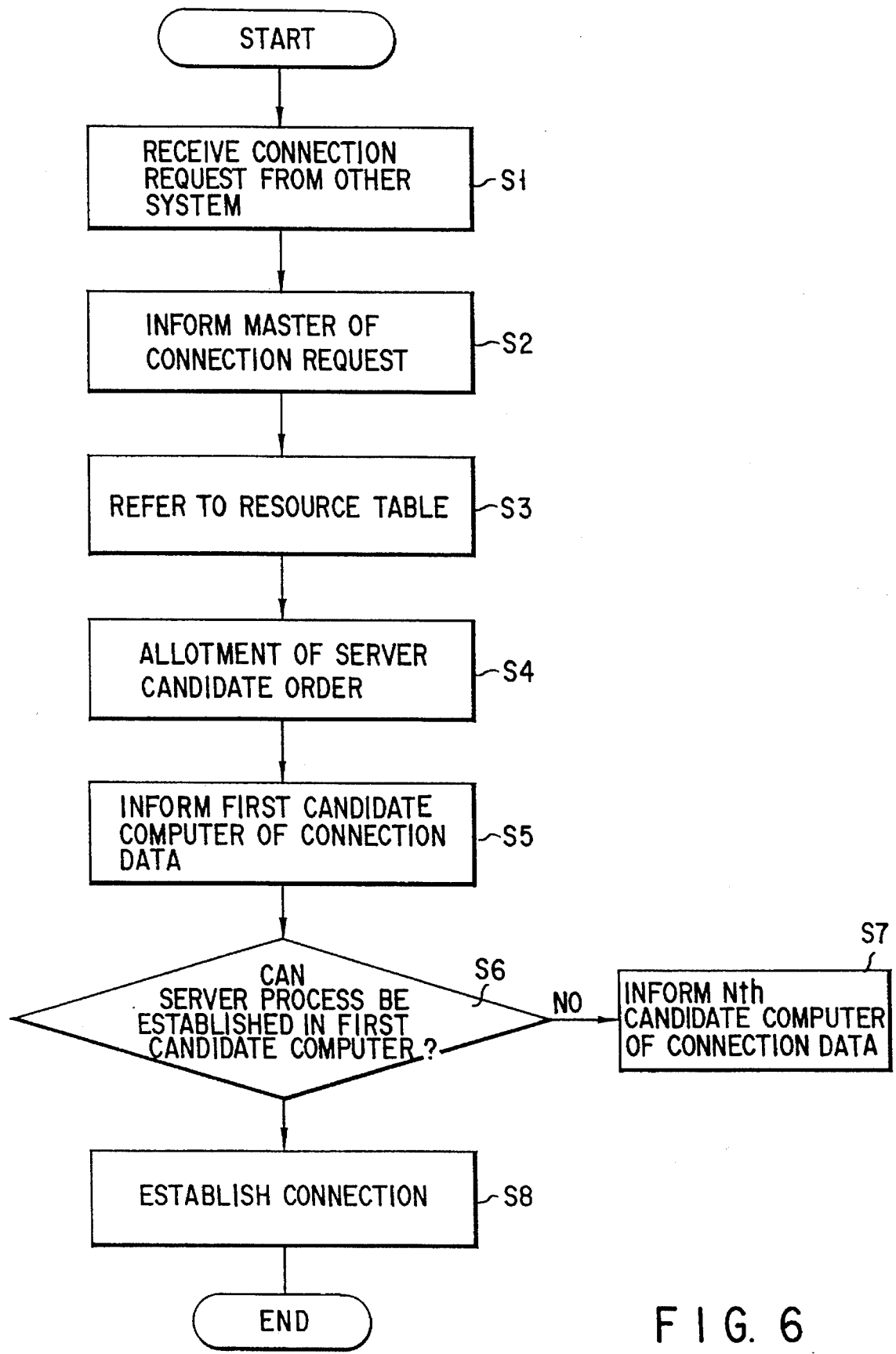
FIG. 6 is a flow chart showing an operation for establishing connection according to a connection request.

An operation for establishing a connection from another system to the loosely coupled computer system 10 will be described below with reference to the flow chart shown in FIG. 6.

The resource managers 112, 122, and 132 of the computers 11 through 13 in the loosely coupled computer system 10 execute checking operations of operation states of other computers at predetermined time intervals by message exchange operations, thereby exchanging physical and logical resource data among the computers 11 through 13.

The resource manager (the resource manager 112 of the computer 11 in this embodiment) of the master computer determined by, e.g., system definition, holds the physical and logical resource data of the computers 11 through 13 in the format shown in FIG. 3, and updates these data with latest ones. Which computer serves as the master computer is informed in advance to the communication controller 14.

In this setting state, when the communication controller 14 receives a connection request from another system through the communication line L1 (step S1), the connection request is sent from the communication controller 14 to the resource manager 112 of the master computer 11 (step S2). The resource manager 112 refers to the resource management table 33 shown in FIG. 3 (step S3) so as to select a plurality of computers (server candidates) suitable for a requested connection on the basis of the physical resource data of the CPU 21, the memory 23, and the like, and the logical resource data of, e.g., jobs, files, and the like. The resource manager 112 allots a priority order to the selected computers (step S4).

The priority order is allotted in the order from a computer whose contents of the physical and logical resource data are best suitable for a connection request, like the first server candidate computer, the second server candidate computer, . . . . For example, if a connection request start-requests a sort job, a memory resource is a main factor for determining a server. If a connection request start-requests a file access, the number of I/O waits is a main factor for determining a server.

The resource manager 112 transmits a message including connection data and server candidate order data, as shown in FIG. 5, to the first server candidate computer through the bus 15 or 16 (step S5). The resource manager 112 checks in step S6 if server processing of the first server candidate computer can be established. If NO in step S6, the resource manager 112 informs connection data to an Nth candidate computer (step S7). On the other hand, if it is determined in step S6 that server processing of the first server candidate computer can be established, the resource manager 112 establishes a connection in step S8.

When an error occurs in the first server candidate computer, data is sent from the first server candidate computer to the second server candidate computer, so that the server is switched to the second server candidate computer. In this case, an instruction indicating that the second server candidate computer is operated in place of the first server candidate computer must be informed to the second server candidate computer. This instruction is informed from the master computer or the first server candidate computer to the second server candidate computer. Thereafter, a connection between the second server candidate computer and a system, which issued a request, is established again.

As described above, according to the present invention, the computer resources of the plurality of computers 11 through 13 are managed by the resource manager 112 of the master computer, and allotment of a server for a connection request is determined based on these managed computer resources (physical and logical resources). For this reason, a computer having computer resources suitable for a connection request from another computer system can serve as a server, thus improving communication performance.

According to the present invention, other systems can regard the loosely coupled computer system 10 as one node. Even when one computer in the loosely coupled computer system 10 malfunctions, it can be automatically replaced with another computer. In this case, since a server is switched from the first candidate computer to a second candidate computer, a computer having computer resources second suitable for a connection request can serve as a server even when the server is switched. Therefore, sufficiently high-performance communications can be realized.

Note that communication lines between the communication controller 14 and other systems, and the communication controller 14 itself may be duplexed, thus constituting a system having higher reliability.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A loosely coupled multiprocessor having a communication function with another computer system, and including a plurality of processors each having its own local memory, comprising:

resource management means for managing computer resources of said plurality of processors included in said loosely coupled multiprocessor;

communication control means for controlling connections between each of said plurality of processors and said another computer system;

server allotment means for, when said communication control means receives a connection request from said another computer system, selecting a processor serving as a server for the connection request from said plurality of processors on the basis of contents of the computer resources; and means for designating one of said plurality of processors which has been started earliest among said plurality of processors as the master processor, wherein said server allotment means selects one of a plurality of processors having a priority order as server candidates for the connection request, wherein, when the server malfunctions, said server allotment means sequentially changes the processor selected as the server according to the priority order, wherein the priority order of the selected processor is determined according to a connection request, wherein an arbitrary one of said plurality of processors serves as a master computer, and comprises said resource management means and said server allotment means, and wherein said master computer comprises means for informing, to the remaining processors, that it is the master computer.

2. The multiprocessor according to claim 1, wherein the processors other than the master computer comprise means for performing local resource management, and informing local resource data to the master computer.

* * * * *